United States Patent
Wang

(12) 
(10) Patent No.: US 11,027,832 B2
(45) Date of Patent: Jun. 8, 2021

(54) MULTI-ROTOR AIRCRAFT

(71) Applicant: MAKEBLOCK CO., LTD., Guangdong (CN)

(72) Inventor: Jianjun Wang, Guangdong (CN)

(73) Assignee: MAKEBLOCK CO., LTD., Guangdong (CN)

( * ) Notice: Subject to any disclaimer, the term of this patent is extended or adjusted under 35 U.S.C. 154(b) by 414 days.

(21) Appl. No.: 16/302,217

(22) PCT Filed: May 18, 2016

(86) PCT No.: PCT/CN2016/082496
§ 371 (c)(1),
(2) Date: Nov. 16, 2018

(87) PCT Pub. No.: WO2017/197602
PCT Pub. Date: Nov. 23, 2017

(65) Prior Publication Data
US 2019/0291855 A1    Sep. 26, 2019

(51) Int. Cl.
*B64C 27/20*    (2006.01)

(52) U.S. Cl.
CPC ........ *B64C 27/20* (2013.01); *B64C 2201/024* (2013.01); *B64C 2201/027* (2013.01); *B64C 2201/042* (2013.01); *B64C 2211/00* (2013.01)

(58) Field of Classification Search
CPC ........................... B64C 27/00; B64C 2211/00
See application file for complete search history.

(56) References Cited

U.S. PATENT DOCUMENTS 8,473,123 B2 * 6/2013 Sun .................. B64C 27/20
                                                    701/3
9,139,130 B2    9/2015 Wolfe
2016/0311526 A1 * 10/2016 Geise ................. B64C 27/14

FOREIGN PATENT DOCUMENTS

CN    101992854 A    3/2011
CN    102556341 A    7/2012
(Continued)

OTHER PUBLICATIONS

International Searching Authority, International Search Report (ISR) and Written Opinion for International Application No. PCT/CN2016/082496, dated Feb. 17, 2017, 9 pages, State Intellectual Property Office of the P.R.C., China.

*Primary Examiner* — Jessica B Wong
(74) *Attorney, Agent, or Firm* — Alston & Bird LLP

(57) ABSTRACT

A multi-rotor aircraft (100) is provided, comprising: a main aircraft assembly (10) comprising a first magnetic medium (13), a main housing (11), and a control motherboard accommodated in the main housing (11), wherein the first magnetic medium (13) is provided on the main housing (11), a slot (1120) is further provided on the main housing (11), and a connection point of the control motherboard is provided in the slot (1120); and a plurality of rotor systems (20), wherein each of the plurality of rotor systems comprises a second magnetic medium (23), a rotor mechanism (21), and a rotor protection cover (22) that is of a hollow annular structure and is fixed outside the rotor mechanism (21), wherein the second magnetic medium (23) is fixed to the rotor protection cover (22) and attracting the first magnetic medium (13), and a pin (2200) matching the slot (1120) is further provided on the rotor protection cover (22). The rotor systems (20) can be quickly mounted on or dismounted from the main aircraft assembly (10), thereby achieving the (Continued)

technical effects of shortening the mounting and dismounting time and improving the operation efficiency.

10 Claims, 3 Drawing Sheets

(56) References Cited

FOREIGN PATENT DOCUMENTS

| | | |
|---|---|---|
| CN | 104260879 A | 1/2015 |
| CN | 205675237 U | 11/2016 |

* cited by examiner

MULTI-ROTOR AIRCRAFT

CROSS-REFERENCE TO RELATED APPLICATIONS

This application is a National Stage of International Application No. PCT/CN2016/082496, filed on May 18, 2016, which is hereby incorporated by reference in its entirety.

BACKGROUND

Technical Field

The present invention relates to the technical field of unmanned aerial vehicles, and more particularly, to a multi-rotor aircraft.

Description of Related Art

With the scientific and technological society continuing to advance, the industry of unmanned aerial vehicles has been gradually growing. The multi-rotor aircraft, which is simple both in mechanical structure and in power system, and capable of taking off and landing in a vertical manner, etc., has been developing so rapidly that researchers have rushed to conduct researches on it and usage thereof, and currently, there is a great zeal for its commercialization around the world.

As for the unmanned aerial vehicle in the prior art, its rotor mechanism is generally fixed directly to the main housing via a bolt. With this connecting manner in which fixing is achieved directly using a bolt, an external handle is required to drive bolts for the rotor mechanism so as to accomplish its mounting and dismounting. As for a multi-rotor aircraft, its rotor mechanisms are often numerous in number. In such case, when several rotor mechanisms of the multi-rotor aircraft require to be mounted or dismounted, the mounting and demounting work would be troublesome, thereby affecting the operation efficiency of workers.

BRIEF SUMMARY

It is an object of the present application to provide a multi-rotor aircraft that can be mounted and dismounted quickly so as to improve the operation efficiency.

In order to achieve the above object, the present application provides the following technical solution:

a multi-rotor aircraft is provided, comprising:

a main aircraft assembly comprising a first magnetic medium, a main housing, and a control motherboard accommodated in the main housing, wherein the first magnetic medium is provided on the main housing, a slot is further provided on the main housing, and a connection point of the control motherboard is provided in the slot;

and a plurality of rotor systems, wherein each of the plurality of rotor systems comprises a second magnetic medium, a rotor mechanism, and a rotor protection cover that is of a hollow annular structure and is fixed outside the rotor mechanism, wherein the second magnetic medium is fixed to the rotor protection cover and attracting the first magnetic medium, and a pin matching the slot is further provided on the rotor protection cover;

wherein the rotor system is positioned on and electrically connected to the main aircraft assembly by means of the cooperation of the pin with the slot, and is also fixed to the main aircraft assembly via the magnetic force between the first magnetic medium and the second magnetic medium.

Here, the main housing is structured as a hollow regular hexagonal prism, and comprises two oppositely disposed end surfaces and prism faces for connecting the two end surfaces, wherein each of the rotor protection covers is fixed correspondingly to one of the prism faces, wherein the rotor protection cover is structured as a regular hexagon, and an edge on the rotor protection cover that is provided with the pin is fixed to one of the prism faces of the main housing.

Here, forward directions of rotating shafts of the plurality of rotor systems are identical, and are perpendicular to the end surfaces of the main housing.

Here, the rotor protection cover comprises first connecting surfaces and a second connecting surface for connecting two of the first connecting surfaces, wherein the pin and the second magnetic medium are provided on the second connecting surface; the rotor systems are six in number, wherein the second connecting surface of the rotor protection cover of each rotor system is fixed to one of the prism faces of the main housing, and the first connecting surfaces of two adjacent rotor protection covers abut against each other.

Here, the multi-rotor aircraft further comprises a third magnetic medium provided on each of the first connecting surfaces, wherein the third magnetic media on two of the first connecting surfaces that abut against each other attract each other.

Here, the rotor protection cover comprises first connecting surfaces and a second connecting surface for connecting two of the first connecting surfaces, wherein the pin and the second magnetic medium are provided on the second connecting surface; the rotor systems are six in number, and the second connecting surface of the rotor protection cover of each rotor system is fixed to one of the prism faces of the main housing, wherein forward directions of rotating shafts of two of the rotor systems that are fixed to two opposite prism faces of the main housing are identical, and are parallel to the end surfaces of the main housing, while those of rotating shafts of the remaining four rotor systems are identical, and are perpendicular to the end surfaces of the main housing.

Here, the multi-rotor aircraft further comprises a third magnetic medium provided on each of the first connecting surfaces, wherein two of the third magnetic media attract each other.

Here, the slot has a cruciform shape.

Here, the main housing comprises a base, a connecting plate and an upper cover, wherein the base and the upper cover constitute two end surfaces, the connecting plate is fixed to a side surface of the base, the slot is formed in the connecting plate, and the control motherboard is fixed to the base.

Here, the bottom surface of the base is further provided with a supporting point on the outer side opposite to the upper cover.

In the present application, as the bonding force is produced by the mutual attraction between the first magnetic medium provided on the main aircraft assembly and the second magnetic medium provided on the rotor system, and the slot provided on the main aircraft assembly is allowed to cooperate with the pin provided on the rotor system to achieve positioning matching and electric connection between the main aircraft assembly and the rotor system, the rotor system can be quickly mounted on or dismounted from the main aircraft assembly, thereby achieving the technical effects of shortening the mounting and dismounting time and improving the operation efficiency.

BRIEF DESCRIPTION OF THE FIGURES

In order to illustrate the technical solution set forth in the embodiments of the present application or the prior art more clearly, the accompanying drawings required to be used in the embodiments will now be described below briefly. It is obvious that the accompanying drawings in the following description are merely some embodiments of the present application, and for those of ordinary skill in the art, other accompanying drawings can be obtained from these accompanying drawings without the exercise of inventive faculty.

DETAILED DESCRIPTION OF VARIOUS EMBODIMENTS

The technical solution set forth in the embodiments of the present application will be described below in a clear and thorough manner in conjunction with the accompanying drawings in the embodiments of the present application. It is obvious that the described embodiments only constitute some of the embodiments of the present application, instead of all the embodiments thereof. Based on the embodiments in the present application, all the other embodiments obtained by those of ordinary skill in the art without inventive work shall be covered by the scope of protection of the present application.

The ordinal qualifiers (e.g., the first, the second, etc.) employed in the following embodiments of the present application are merely distinctive phrases used for clearly illustrating similar features in the present application, and not intended to represent the arrangement or usage order of corresponding features.

Figure 1:
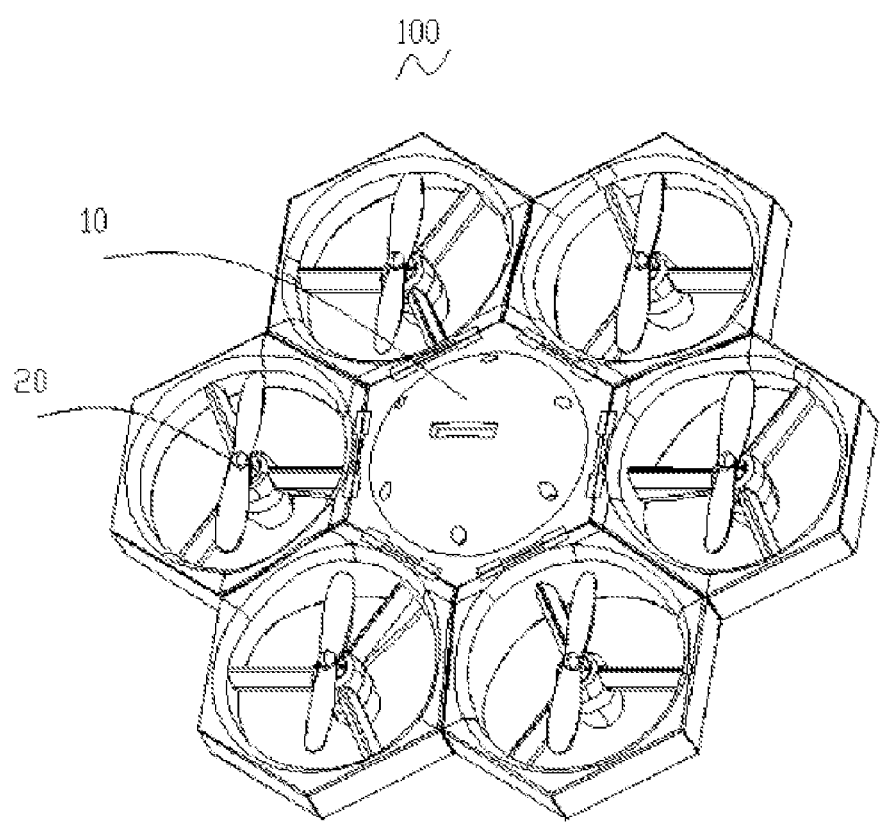
FIG. 1 is a schematic diagram of a multi-rotor aircraft provided by an implementation of the present application.
Figure 2:
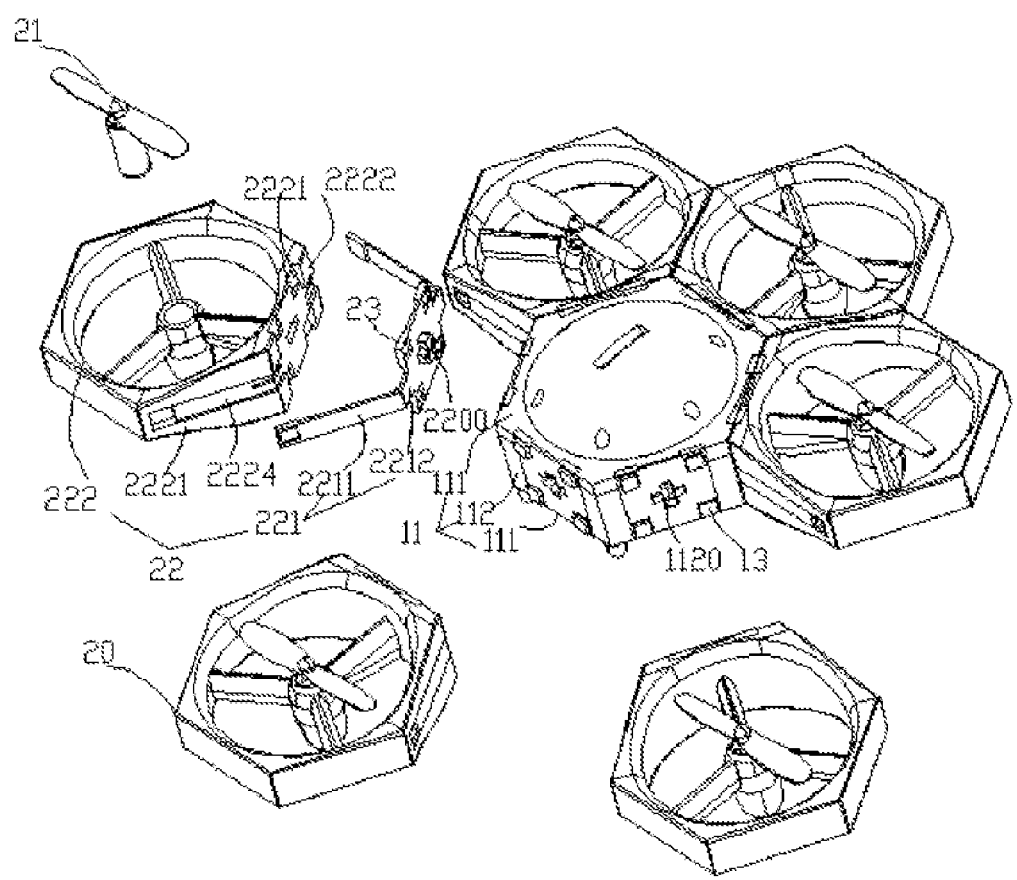
FIG. 2 is an exploded diagram of the aircraft of FIG. 1.

Referring to FIGS. 1 and 2, a multi-rotor aircraft 100 of the present application comprises a main aircraft assembly 10 and rotor systems 20, wherein the rotor systems 20 are numerous in number. The main aircraft assembly 10 comprises a first magnetic medium 13, a main housing 11 and a control motherboard (not shown). The control motherboard is accommodated in the main housing 11, wherein the main housing 11 comprises two oppositely disposed end surfaces 111 and a plurality of prism faces 112 for connecting the two end surfaces 111, wherein each of the prism faces 112 is provided with the first magnetic medium 13 and the slot 1120, a connection point of the control motherboard is provided in the slot 1120, and the control motherboard is electrically connected with each of the rotor systems 20 via the connection point.

It will be understood that the main aircraft assembly 10 is also provided with a removable battery, an LED indicator lamp, an extension interface, etc. However, these components will not be highlighted herein as they are not the subject matter claimed to be protected in the present invention.

Each of the rotor systems 20 comprises a rotor mechanism 21, a rotor protection cover 22 and a second magnetic medium 23, wherein the rotor protection cover 22 is of a hollow annular structure, and is fixed outside the rotor mechanism 21 for protecting the rotor mechanism 21. The second magnetic medium 23 is fixed to a side surface of the rotor protection cover 22, and attracts the first magnetic medium 13 so as to physically connect the rotor system 20 with the main aircraft assembly 10. The side surface is further provided with a pin 2200 that matches the slot 1120, and the rotor system 20 is electrically connected with the control motherboard within the main aircraft assembly 10 via the pin 2200. In addition, the cooperation of the pin 2200 with the slot 1120 may also hold the relative positions between the rotor system 20 and the main aircraft assembly 10, thereby exhibiting positioning effects.

The rotor mechanism 21 is a valuable and important component for the multi-rotor aircraft 100, and thus certain measures are required to protect it. When the multi-rotor aircraft 100 is in a flying or resting state, the rotor protection cover 22 can, to a certain extent, protect the rotor mechanism 21 from being damaged as a result of external factors. Without the protection of the rotor protection cover 22, the rotor mechanism 21 would be likely to scratch a user or other items during rotation. Furthermore, the bare rotor mechanism 21 would also be likely to scratch a user even if it is in the resting state. Accordingly, the rotor protection cover 22 can avoid the above situations to a certain extent.

In the present application, as the bonding force is produced by the mutual attraction between the first magnetic medium provided on the main aircraft assembly and the second magnetic medium provided on the rotor system, and the slot provided on the main aircraft assembly is allowed to cooperate with the pin provided on the rotor system to achieve positioning matching and electric connection between the main aircraft assembly and the rotor system, the rotor system can be quickly mounted on or dismounted from the main aircraft assembly, thereby achieving the technical effects of shortening the mounting and dismounting time and improving the operation efficiency.

Figure 3:
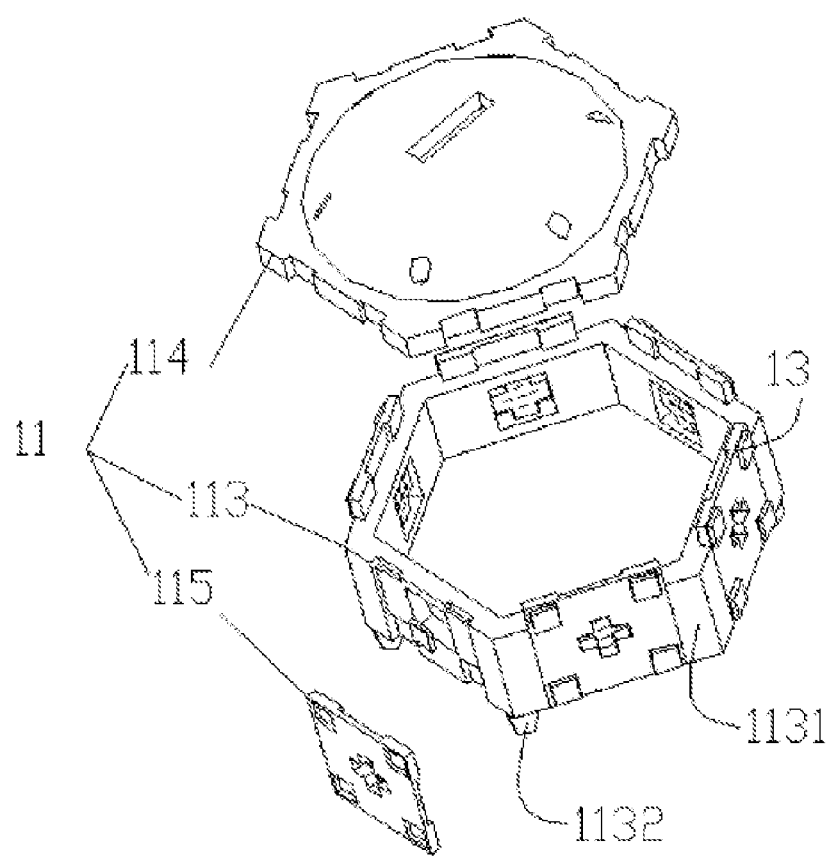
FIG. 3 is an exploded diagram of a main housing of the aircraft of FIG. 1.

For specific contents, reference may be made to FIG. 3. The main housing 11 is structured as a hollow regular hexagonal prism. More specifically, the main housing 11 comprises a base 113, a connecting plate 115 and an upper cover 114, wherein a bottom surface 1130 of the base 113 and the upper cover 114 constitute two end surfaces 111. The base 113 is shaped as a substantially hollow hexagonal prism, and an accommodating chamber is formed between the upper cover 114 and the base 113. The control motherboard is fixed in the accommodating chamber, i.e. that it is fixed to the base 113. The connecting plate 115 is fixed on a side wall 1131 of the base 113. In other words, the connecting plate 115 is fixed on each side wall 1131. The side walls 1131 and the connecting plates 115 cooperate to constitute the prism faces 112 of the main housing. The slot 1120 is formed in the connecting plate 115. The second magnetic medium 23 is fixed to the connecting plate 115. The bottom surface 1130 of the base 113 is further provided with a supporting point 1132 on the outer side opposite to the upper cover 114, wherein the supporting point is used for supporting the multi-rotor aircraft 100.

The rotor protection cover 22 is structured as a regular hexagon, wherein the size of the regular hexagon is substantially the same as that of the cross-section of the regular hexagonal prism, and each of the rotor systems 20 is fixed to one of the prism faces 112 of the main housing 11 through the rotor protection cover 22. Further, the rotor protection cover 22 comprises a connecting member 221 and a housing 222 in the shape of a regular hexagon, and the housing 222 comprises two first side surfaces 2221 and a second side surface 2222 connected between the two first side surfaces 2221. The first side surfaces 2221 of the housing 222 are provided with connecting card slots 2224. The generally E-shaped connecting member 221 comprises two first connecting surfaces 2211 (namely the first connecting surfaces of the rotor protection cover) and a second connecting surface 2212 (namely the second connecting surface of the rotor protection cover) for connecting two of the first connecting surfaces 2211, wherein the first connecting surfaces 2211 of the connecting member are fixed in the connecting card slots 2224, and the second connecting surface 2212 directly faces the second side surface 2222. The second connecting surface 2212 of the connecting member is provided with the pin 2200 on the side distal to the rotor protection cover 22. The second magnetic medium 23 is fixed between the housing 222 and the connecting member 221. Further, the pin 1120 comprises a boss (not numbered) and a bouncing pin (not shown) fixed to the boss, wherein the bouncing pin is used for connection with the connection point of the control motherboard.

Further, with continued reference to FIG. 1, the plurality of rotor systems 20 in the first embodiment of the present application are six in number, wherein the six rotor systems 20 are evenly distributed outside the main housing 11, and each of them is fixed to one of the connecting plates 115. In other words, the second connecting surface of the rotor protection cover 22 of each rotor system 20 is fixed to one of the prism faces 112 of the main housing 11, and the first connecting surfaces 2211 of two adjacent rotor protection covers 22 abut against each other. The rotating shafts of the six rotor systems 20 all are perpendicular to the end surfaces 111 of the main housing, and forward directions of the rotating shafts of the plurality of rotor systems 20 are identical. In the present embodiment, the first connecting surfaces 2211 of two adjacent rotor protection covers 22 abut against each other, such that the operation shaking of the rotor systems 20 can be reduced, thereby improving the stability of the multi-rotor aircraft.

Further, the first connecting surfaces 2211 of the connecting member 221 are each provided with a third magnetic medium (not shown). The mutual attraction between the third magnetic media on the first connecting surfaces of adjacent connecting members may act to fix the plurality of rotor systems 20 more securely, thus further enhancing the stability of the multi-rotor aircraft.

Figure 4:
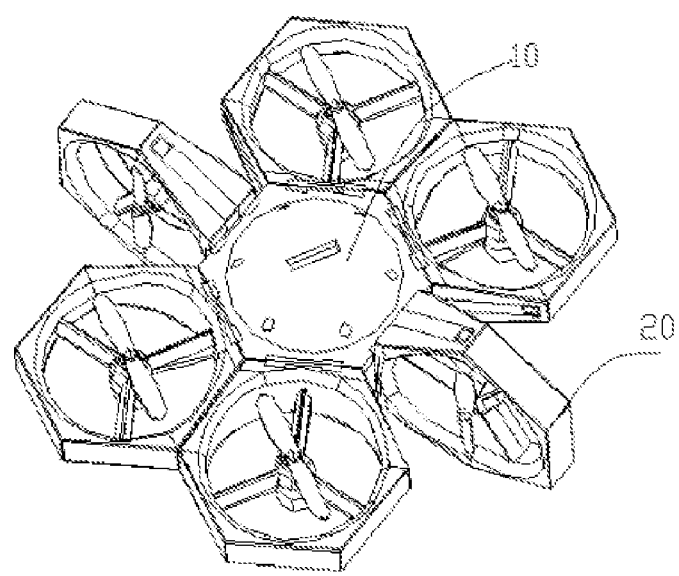
FIG. 4 is a schematic diagram of a multi-rotor aircraft provided by another implementation of the present application.

More specifically, the slot 1120 has a substantially cruciform shape. In other words, the pin 2200 has a cruciform shape. The advantage of such design is that the angle of the rotor systems 20 may be adjusted according to different requirements, thereby achieving multiple flying modes. For example, referring to FIG. 4, the plurality of rotor systems 20 in the second embodiment of the present application are six in number, and each of the rotor systems 20 is fixed to one of the side surfaces of the main housing, wherein forward directions of the rotating shafts of two oppositely disposed rotor systems 20 are identical, and are parallel to the end surfaces 111 of the main housing 11, while the rotating shafts of the remaining four rotor systems 20 are perpendicular to the end surfaces 111 of the main housing, and their forward directions are identical. In other words, as the slot 1120 and the pin 2200 employed in the present application have a cruciform shape, a pair of oppositely disposed rotor systems 20 can be rotated by 90 degrees along the center of the cruciform shape (namely in the direction along which the rotating shafts are parallel to the end surfaces 111), thereby achieving the technical effects that the multi-rotor aircraft does not need to fly forwards/backwards in a slant manner (namely in the direction along which the rotating shafts are parallel to the end surfaces 111).

It will be appreciated that in other embodiments, the number of rotor systems 20 may be four, three, two, etc. Different functions can be achieved by arranging the number and axial directions of the rotor systems 20, which will not be exhaustively enumerated herein.

It will be appreciated that the slot 1120 may also be in the shape of a hexagon, a tetragon, etc.

It will be appreciated that the positions of the slot and the pin can be interchanged. In other words, the pin is provided on the main aircraft assembly, while the slot is provided on the rotor system, and the resultant effects are identical.

It will be appreciated that the main housing 11 in the present application may also be in the shape of a regular trigonal prism, a regular tetragonal prism, a regular pentagonal prism, etc. Correspondingly, the housing 222 is in the shape of a regular triangle, a square, a regular pentagon, etc.

The embodiments of the present application have been described above in detail, and in this document, specific examples are employed to illustrate the principles and implementations of the present application. The illustration of the above embodiments is merely for the purpose of facilitating the understanding of the method and the core idea of the present application. Meanwhile, for those of ordinary skill in the art, changes may be made to the specific implementations and the application range based on the idea of the present application. In conclusion, the contents of this description are not to be construed as limitations on the present application.

The invention claimed is:

1. A multi-rotor aircraft, wherein the multi-rotor aircraft comprises:
   a main aircraft assembly comprising a first magnetic medium, a main housing, and a control motherboard accommodated in the main housing, wherein the first magnetic medium is provided on the main housing, a slot is further provided on the main housing, and a connection point of the control motherboard is provided in the slot; and
   a plurality of rotor systems, wherein each of the plurality of rotor systems comprises a second magnetic medium, a rotor mechanism, and a rotor protection cover that is of a hollow annular structure and is fixed outside the rotor mechanism, wherein the second magnetic medium is fixed to the rotor protection cover and attracting the first magnetic medium, and a pin matching the slot is further provided on the rotor protection cover,
   wherein the rotor systems are positioned on and electrically connected to the main aircraft assembly by means of the cooperation of the pin with the slot, and is also fixed to the main aircraft assembly via the magnetic force between the first magnetic medium and the second magnetic medium.

2. The multi-rotor aircraft of claim 1, wherein the main housing is structured as a hollow regular hexagonal prism, and comprises two oppositely disposed end surfaces and prism faces for connecting the two end surfaces, wherein each of the rotor protection covers is fixed correspondingly to one of the prism faces, wherein the rotor protection cover is structured as a hexagon, and an edge on the rotor protection cover that is provided with the pin is fixed to one of the prism faces of the main housing.

3. The multi-rotor aircraft of claim 2, wherein rotating shafts of the plurality of rotor systems are identical, and perpendicular to the end surfaces of the main housing.

4. The multi-rotor aircraft of claim 3, wherein each rotor protection cover comprises first connecting surfaces and a second connecting surface for connecting two of the first connecting surfaces, wherein the pin and the second magnetic medium are provided on the second connecting surface, wherein the rotor systems are six in number, the second connecting surface of each rotor protection cover of each rotor system is fixed to one of the prism faces of the main housing, and the first connecting surfaces of two adjacent rotor protection covers abut against each other.

5. The multi-rotor aircraft of claim 4, wherein the multi-rotor aircraft further comprises a third magnetic medium provided on each of the first connecting surfaces, wherein the third magnetic medium on two of the first connecting surfaces that abut against each other attract each other.

6. The multi-rotor aircraft of claim 2, wherein each rotor protection cover comprises first connecting surfaces and a second connecting surface for connecting two of the first connecting surfaces, and the pin and the second magnetic medium are provided on the second connecting surface, wherein the rotor systems are six in number, and the second connecting surface of each rotor protection cover of each rotor system is fixed to one of the prism faces of the main housing, wherein rotating shafts of two of the rotor systems that are fixed to two opposite prism faces of the main housing are identical, and are parallel to the end surfaces of the main housing, while rotating shafts of the remaining four rotor systems are identical, and are perpendicular to the end surfaces of the main housing.

7. The multi-rotor aircraft of claim 6, wherein the multi-rotor aircraft further comprises a third magnetic medium provided on each of the first connecting surfaces, wherein two of the third magnetic medium attract each other.

8. The multi-rotor aircraft of claim 1, wherein the slot has a cruciform shape.

9. The multi-rotor aircraft of claim 2, wherein the main housing comprises a base, a connecting plate and an upper cover, wherein the base and the upper cover constitute the two end surfaces, the connecting plate is fixed to a side surface of the base, the slot is formed in the connecting plate, and the control motherboard is fixed to the base.

10. The multi-rotor aircraft of claim 9, wherein the bottom surface of the base is further provided with a supporting point on the outer side opposite to the upper cover.

\* \* \* \* \*